Jan. 8, 1946. W. W. HACKETT 2,392,797
MANUFACTURE OF METAL TUBULAR ARTICLES
Filed March 19, 1942
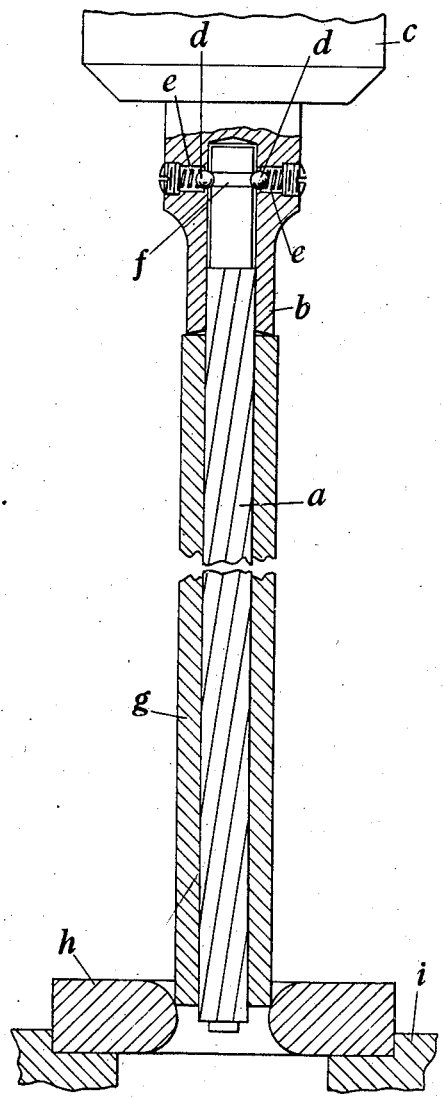
Inventor
Walter William Hackett
By
Cameron, Kerkam & Sutton
Attorneys Patented Jan. 8, 1946

2,392,797

UNITED STATES PATENT OFFICE 2,392,797

MANUFACTURE OF METAL TUBULAR ARTICLES

Walter William Hackett, Oldbury, Birmingham, England

Application March 19, 1942, Serial No. 435,354
In Great Britain June 14, 1941

2 Claims. (Cl. 205—4).

This invention relates to the manufacture of metal tubular articles herein referred to as tubes, and particularly rifle barrels or liners. The object of the invention is to provide an improved method of, and means for imparting any desired configuration such as rifling, fluting, ridging or the like to the internal surface of a tube by the use of a mandrel having on its surface the converse of the configuration to be imparted to the tube, and a die which during relative axial movement of the tube and die compresses the tube on the mandrel.

The invention comprises an extrusion-like process for imparting to the inner surface of a metal tube a configuration such as rifling, fluting, ridging or the like, which consists in placing the tube over a mandrel having on its surface the configuration to be imparted to the tube, and then forcing the tube and mandrel through a die by relative axial movement of the die and a member which acts on the end of the tube remote from that first presented to the die, the mandrel being free to move relatively to the said member to accommodate the extension of the tube which accompanies the operation.

The accompanying drawing illustrates diagrammatically one mode of and means for carrying the invention into effect.

For the rifling of a gun barrel or liner (herein referred to as a tube) I employ a mandrel $a$, having the greater part of its surface formed to a configuration which is complementary to that of the rifling to be produced in the tube, this configuration being indicated by the oblique lines shown on this member in the drawing. The upper end of the mandrel is inserted into a bore formed in an abutment $b$ formed on or secured to a plunger $c$ to which a reciprocatory motion can be given by any convenient means such as a hydraulic or mechanical press. The said end of the mandrel is free to slide in the abutment, and when the mandrel is intended to operate with its axis vertical, a spring catch consisting of balls $d$ acted on by springs $e$ is arranged in the abutment for engaging a groove $f$ in the mandrel, the purpose of the catch being to hold the mandrel temporarily in the initial stage of the rifling operation.

The tube $g$ which is open at both ends is first placed on the mandrel (which it fits fairly closely) and then the upper end of the mandrel is inserted in the abutment. The upper end of the tube may also be pressed into contact with the lower end of the abutment. The diameter of the portion of the abutment immediately adjacent to the tube is of slightly less diameter than the tube and is such that it can pass through the die to be hereinafter described. Further the end of the abutment which makes contact with the tube is preferably formed with a shallow conical or concave recess as shown so that contact with the tube is effected at a position near the periphery of the tube to prevent spreading or expansion of the upper end of the tube by the pressure exerted on it.

The die $h$ is of the kind ordinarily used in extrusion or drawing operations and is adapted to effect a small reduction in the external diameter of the tube, the die being mounted on any convenient stationary support $i$.

After the mandrel and tube have been placed in position the plunger is caused to descend, thereby bringing the lower end of the tube into contact with the die as shown in the drawing. Continued movement of the plunger forces the tube through the die causing the tube to be compressed on the mandrel and its inner surface to acquire the configuration which is complementary to that of the mandrel. During this action the length of the tube is increased to some extent, and as the portion of the tube which has passed through the die tightly grips the mandrel, relative movement occurs between the mandrel and the portion of the tube above the die. This movement is accommodated by the freedom of the upper end of the mandrel to move relatively to the abutment. When the spring catch above described is used this movement of the mandrel causes it to become detached from the catch. After the tube has been pushed through the die the tube and mandrel are taken away from the underside of the die and the plunger is returned to its initial position in readiness for a repetition of the above described operation on the next tube.

The mandrel is then extracted from the tube, but as the tube usually grips the mandrel very tightly after it has passed through the die a releasing operation is usually necessary before the mandrel can be withdrawn. This releasing is conveniently effected by passing the tube and mandrel through a reeling or like machine which slightly expands the tube and thereby makes it easy to extract the mandrel.

Whilst I have described in the foregoing a process in which the tube and mandrel are moved vertically downwards through a fixed die, the operation may be carried out in the reverse direction, or the plunger and mandrel may be moved horizontally through a fixed die, in either of which cases the catch in the abutment above described is unnecessary. Also whilst it is usually more convenient to employ a fixed die and a movable abutment, this is not essential to the invention as the abutment may be fixed and the die movable, in which case the tube is stationary during the rifling operation.

The invention is also applicable to a variety of other uses in essentially the same way as that above described. For example it may be employed for forming spiral or other flutes, longitudinal ribs, splines, ridges or the like or any other desired pattern on the interior surface of a metal tubular article, provided always that the configuration of the pattern is such as will permit the mandrel to be withdrawn with or without the aid of a reeling or like releasing operation.

The process above described is analogous to an extrusion as distinct from a drawing process in that during relative movement of the tube and die, the tube is subject to endwise pressure, this pressure being exerted by the abutment on the end of the tube remote from the one first presented to the die when a movable abutment is used, or being resisted by the abutment when a stationary abutment is used. By the use of the said process important advantages are obtained as compared with a drawing process as it involves no wastage of any part of the work piece, and the total operation-time necessary for effecting the desired result is relatively very small.

Having thus described my invention what I claim as new and desire to secure by Letters Patent is:

1. An extrusion-like process for imparting to the inner surface of a metal tube a configuration such as rifling, fluting, ridging, or the like, which consists in placing the tube over a mandrel having on its surface the converse of the configuration to be imparted to the tube, and then forcing the tube and mandrel through a die by relative axial movement of the die and a member which acts on the end of the tube remote from that first presented to the die, the mandrel being free to move relatively to the said member to accommodate the extension of the tube which accompanies the operation.

2. Means for imparting to the inner surface of a metal tube a configuration such as rifling, fluting, ridging or the like, comprising the combination of a mandrel on which the tube can be placed and which has on its surface the converse of the configuration to be imparted to the tube, a die through which the tube and mandrel can be forced, and an abutment adapted to receive one end of the mandrel and to act on the end of the tube remote from that first presented to the die, the abutment and die being relatively movable for forcing the tube and mandrel through the die, and the mandrel being free to move axially relatively to the said abutment to accommodate extension of the tube which accompanies the operation.

WALTER WILLIAM HACKETT.